United States Patent [19]

Elford

[11] Patent Number: 4,892,271

[45] Date of Patent: Jan. 9, 1990

[54] CORONA DISCHARGE SURFACE TREATMENT AND AIRCRAFT COCKPIT CANOPIES SO TREATED

[75] Inventor: Andrew M. Elford, Eastleigh, United Kingdom

[73] Assignee: British Aerospace PLC, London, United Kingdom

[21] Appl. No.: 255,398

[22] Filed: Oct. 11, 1988

[30] Foreign Application Priority Data

Oct. 14, 1987 [GB] United Kingdom ............... 8724078

[51] Int. Cl.[4] ............................................. B64C 1/14
[52] U.S. Cl. ............................... 244/121; 156/272.6; 427/39
[58] Field of Search .................... 244/121; 156/272.6, 156/272.2; 427/39

[56] References Cited

U.S. PATENT DOCUMENTS 2,876,358  3/1959  Root ................................ 156/272.6

FOREIGN PATENT DOCUMENTS 877908   9/1961   United Kingdom .
1038778  8/1966   United Kingdom .
1065084  4/1967   United Kingdom .
1100414  1/1968   United Kingdom .
1184451  3/1970   United Kingdom .
1212620  11/1970  United Kingdom .
1383513  2/1975   United Kingdom .
2022323  12/1979  United Kingdom .
2114377  8/1983   United Kingdom .

Primary Examiner—Sherman D. Basinger
Assistant Examiner—Rodney Corl
Attorney, Agent, or Firm—Kerkam, Stowell, Kondracki & Clarke

[57] ABSTRACT

Apparatus for and a method of rendering selected areas 17, 18 of an aircraft canopy 2 receptive to an adhesive by means of which a detonating cord 7 is attached in loop form to the canopy, to facilitate fracture of the canopy for pilot ejection in an emergency, comprises pretreating those areas 17, 18 by corona discharge. The canopy 2 is mounted in a jig 10 shaped to conform with the canopy and having rebates 11 for accommodating discharge electrodes 12 located at a distance from the canopy 2. A pump 16 is provided to remove ozone formed due to the discharge and trapped between the canopy 2 and the jig 10.

7 Claims, 4 Drawing Sheets

CORONA DISCHARGE SURFACE TREATMENT AND AIRCRAFT COCKPIT CANOPIES SO TREATED

This invention relates to corona discharge surface treatment, and aircraft cockpit canopies so treated. A particular, but not exclusive, application of the invention is in connection with aircrew escape systems which employ explosive cord arrangements located to aircraft canopy transparencies to cause fracture and break-up of the transparency when a crew member requires to make an emergency exit from the aircraft.

An aircrew escape system using a form of explosive cord known as 'Miniature Detonating Cord' (hereafter referred to as 'MDC') is disclosed in British Patent No, 1,383,513. This prior invention provides an arrangement wherein an aircraft cockpit canopy includes detonating cord which is located around the periphery of the canopy transparency but is further extended in loop configuration across the surface of the transparency away from the periphery in a predetermined pattern particularly concentrated in the area through which the escaping crew member will pass on ejection. Now, whilst the periphery cord in this arrangement is maintained in contact with the transparency by mechanical retaining means that cord portion which extends across the surface of the transparency must rely on being adhesively bonded to the surface. The efficiency of the detonation effect will be dependent on a number of factors not least of which is the efficiency of the adhesive bond, whatever cord type is used. For example, in the case of British patent No. 1,383,513 the cord used for the surface pattern is preferably that known as D-cord, that is, it is D-shaped in cross-section to provide a flat adhesive contact face. The cord may be contained within a protective shrinkable polyolefin sleeve for example. Alternatively, however, it is known for a circular crosssectional cord to be contained in an elastomer back-up extrusion. Whatever arrangement is employed, high adhesion integrity is essential.

For its mechanical and optical properties, the preferred material for the transparency is an acrylic material. However, due to the low surface energy of the acrylic material, the adhesive employed may not be able to 'wet' the surface effectively. As further disclosed in the prior art referenced above, this problem was sought to be solved by the technique of abrading the acrylic surface by appropriate means, such as 'wet and dry' paper of suitable grade, in a pattern corresponding to that followed by the cord and which is proven in practice to achieve a bond at least comparable with the strength of bond achieved by the adhesive with the polyolefin sleeve or elastomer extrusion containing the cord. This practice of abrading, however, is a manual operation utilising, ideally, an abrading 'stencil type' template. It has certain shortcomings in that, for example, it produces a residue of abrasive so that the transparency must be subjected to a careful cleansing operation prior to cord attachment. Furthermore, it may be difficult to ensure consistency of the abraded surface and, since the abrading can destroy optical clarity, its effective width must not be significantly greater than the cord width which in turn necessitates precise cord location means.

Corona discharge surface treatment of web materials is well-known and the technique has been applied also to shaped bodies, as is disclosed e.g. in GB-A-No. 2,114,377. However, this and other prior art proposals suffer from the drawbacks of requiring complicated and expensive arrangements of controlling the areas of the workpiece to be treated and are not suitable to pretreat aircraft cockpit canopies.

It is a particular object of the present invention to overcome these shortcomings by the provision of apparatus and an improved method of applying a detonating cord to an aircraft canopy transparency which obviates the need for an abraded adhesive-receptive surface.

According to one aspect of this invention there is provided apparatus for electrically pre-treating selected areas of an article by corona discharge comprising an electrically non-conductive jig shaped to conform with the internal shape of and to mount the article, one or more rebates in an external surface of said jig of a shape, size and position corresponding to said selected areas, electrodes located in said rebates at a depth arranged so that a predetermined gap will be defined between said electrodes and the internal surface of the article and means to connect said electrodes and said article to opposite polarity terminals of a voltage generator so that in use the article to be pre-treated may be placed on the jig such that it is in contact therewith except at the selected areas and a potential difference may be applied between the article and the electrodes, to form a corona discharge across said article at said selected areas.

Preferably said jig includes bores therethrough for connection to a pump for removing the gaseous ionisation products of the corona discharge trapped between the jig and the article.

The article to be treated may be, for example, an aircraft cockpit canopy and the rebate and the electrode may then be shaped to correspond to the shape of an MDC to be adhesively attached to the inner surface of the canopy.

According to another aspect of the invention there is provided a method of applying an adhesively attachable detonating cord arrangement to an aircraft canopy transparency, including the steps of modifying at least a portion of the canopy transparency to give an adhesive receptive surface, forming the detonating cord arrangement into the required configuration, applying a curable adhesive to the adhesion face of the detonating cord arrangement, offering up said cord arrangement to the transparency surface and affixing the cord, still in the desired configuration to the transparency adhesive receptive surface, removing the template and curing the adhesive, characterised in that the adhesive receptive surface is obtained by subjecting at least that portion of the transparency surface to which the detonating cord is attached to a corona discharge process, using apparatus according to any of the preceding statements of the invention.

According to a further aspect of the present invention there is provided an aircraft cockpit canopy with detonating cord to facilitate fracture and break-up of the canopy transparency for aircrew emergency ejection purposes, the detonating cord being located around the periphery of the transparency and extending in loop configuration across the surface of the transparency away from the periphery, being laid in predetermined pattern particularly concentrated in the areas through which the escaping crew member will pass on ejection, at least a portion of the detonating cord being adhesively attached to said transparency, said transparency having an adhesive receptive surface provided by means of a corona discharge process.

Corona discharge is achieved by increasing an applied voltage between an electrode and a counter-electrode until the threshold value for electrical breakdown of the air gap is exceeded, as a result of which the air is ionised and becomes plasma. By applying the voltage at high frequency a continuous discharge is obtained and if a suitable transparency material, as in the present application, is interposed relative to the electrodes to maintain a suitable air gap, when subject to an electrical bombardment will result in a surface which has an increased surface energy, is more wettable and more adhesive receptive. Beneficially, the surface may be cleaned as a result of the ionisation to assist the adhesion even further.

The present invention will now be described, by way of example only, with reference to the accompanying drawings, in which.

Figure 1:
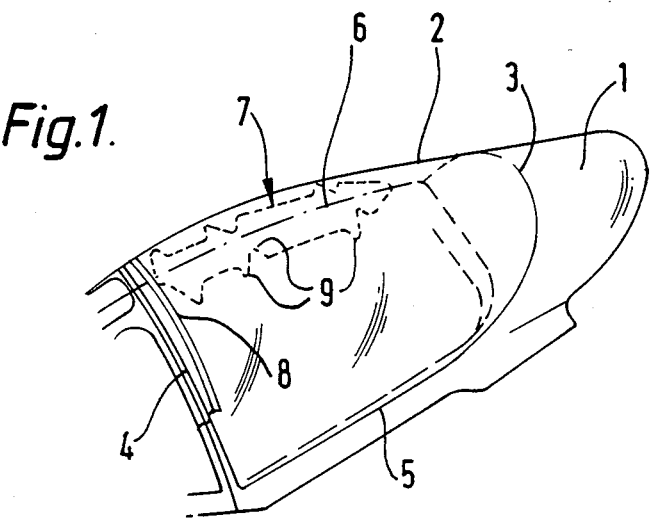
FIG. 1 illustrates a typical aircraft canopy arrangement.

Referring to FIG. 1, an aircraft cockpit canopy 1 has a canopy transparency 2 which is bounded by a rear arch 3, a forward arch 4 and canopy sill structure 5. Located symmetrically about the top centre 6 of the canopy is a run of miniature detonating cord 7 laid in a loop configuration leading out a the peripheral cord run 8 near the forward arch 4. The loop configuration is shown in broken line to indicate that the cord 7 is laid on the inner surface of the transparency 2; it has a series of more or less sharp bends 9 to act as crack initiators when the cord is detonated. The peripheral cord run 8 extends around the periphery of the canopy transparency but has been largely omitted.

Figure 2:
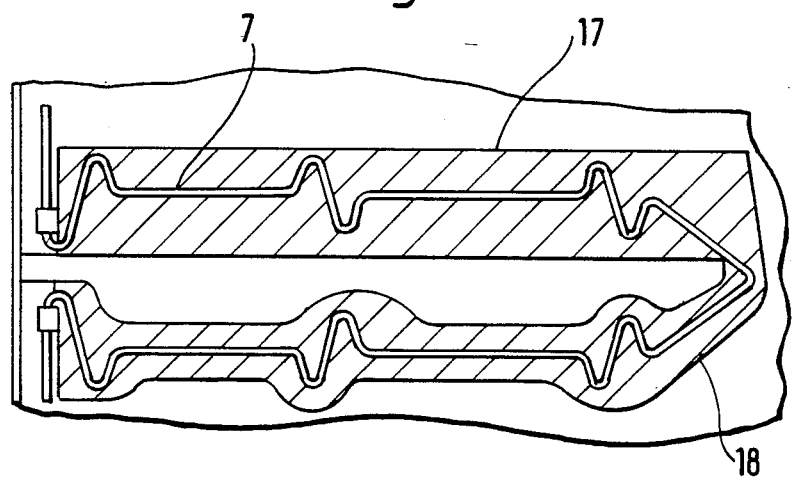
FIG. 2 illustrates an inverted fragmentary plan view, on an enlarged scale, of the canopy with the detonating cord installation of FIG. 1.

FIG. 2 shows a localised view of the loop configuration of cord. It is inverted a view on the inner surface of the transparency. In the prior art method of cord attachment the transparency surface is abraded in conformity with the MDC configuration to given an adhesive receptive-surface. For reasons of optical clarity little deviation of the abraded area can be permitted since that can lead to unacceptable obstruction of vision.

As embodied in the present invention, the inner surface is subjected to a corona discharge treatment to stimulate surface energy and enhance wettability. The benefit of this treatment is that the high gloss surface of the transparency is unimpaired: since the treatment imparts no visible change in the surface characteristics and maintains high optical clarity. It will be appreciated that this treatment may therefore be applied either, (a) over the whole inside surface of the transparency, or (b) a wide band 17 (FIG. 2) adjacent the required location of the cord configuration 7, or (c) as indicated at 18 9FIG. 2) approximately following the cord configuration.

Figure 3:
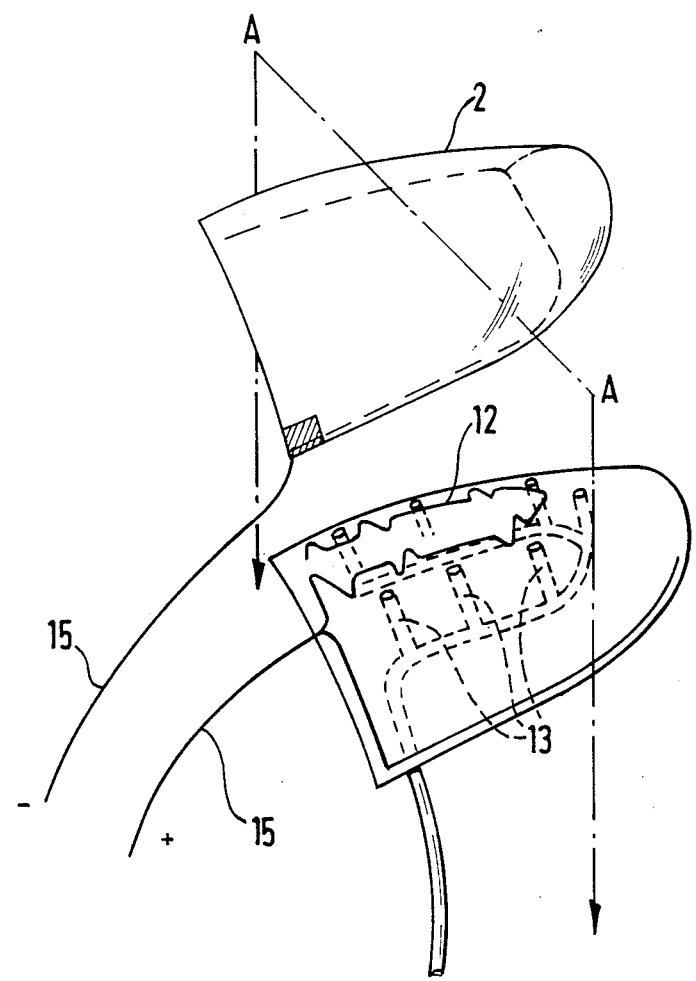
FIG. 3 and 4 are perspective part-exploded views of corona discharge apparatus for pre-treating different types of selected areas on an aircraft canopy.
Figure 5:
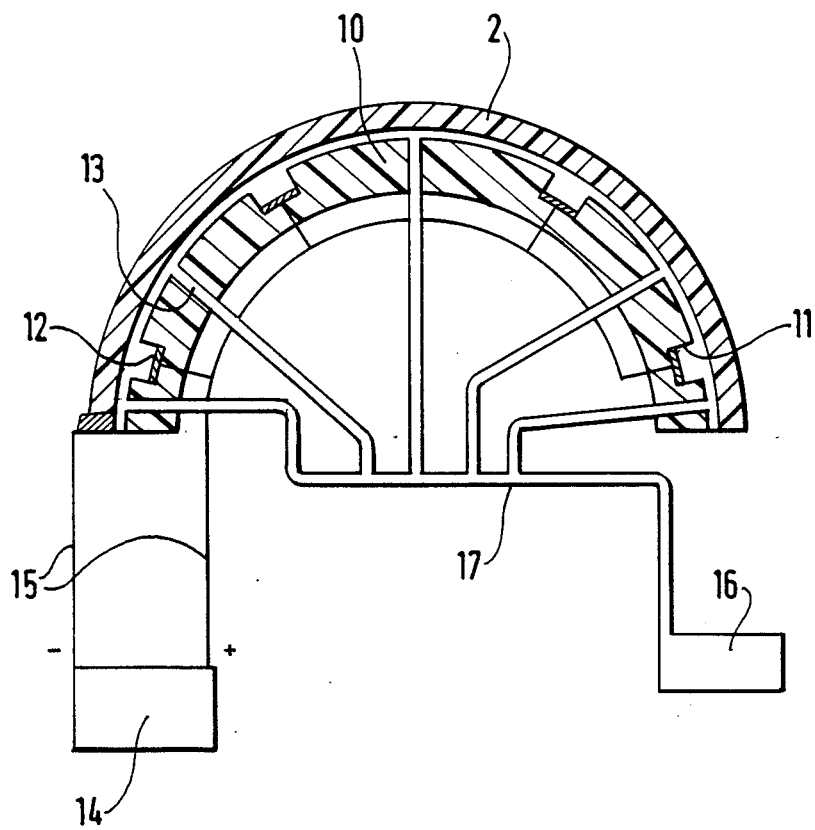
FIG. 5 is a sectional view along the plane indicated by lines A—A of the corona discharge apparatus of FIGS. 3 and 4 for pretreating an aircraft canopy to which the detonating cord installation of FIG. 2 is to be applied.

FIGS. 3 and 5 show a corona discharge apparatus comprising a jig 10 made of glass-reinforced plastics which is shaped to correspond to the inner surface of the transparent canopy. The jig 10 has a plurality of rebates 11, each containing countersunk corona discharge electrodes 12. Bores 13 are provided through the jig 10 for a purpose described below. The electrodes 12 and the canopy 2 are in use connected to a high voltage generator 14 via flexible high voltage leads 15. The bores 13 are connected to an extraction pump 16 via a network of pipes 17. The rebates 11 are each of a depth to ensure that the exposed face of the electrodes 12 are typically 1.5 mm below the outer surface of the jig 10. The rebates 11 and the electrodes 12 are shaped to correspond with the MDC cord 7.

Figure 4:
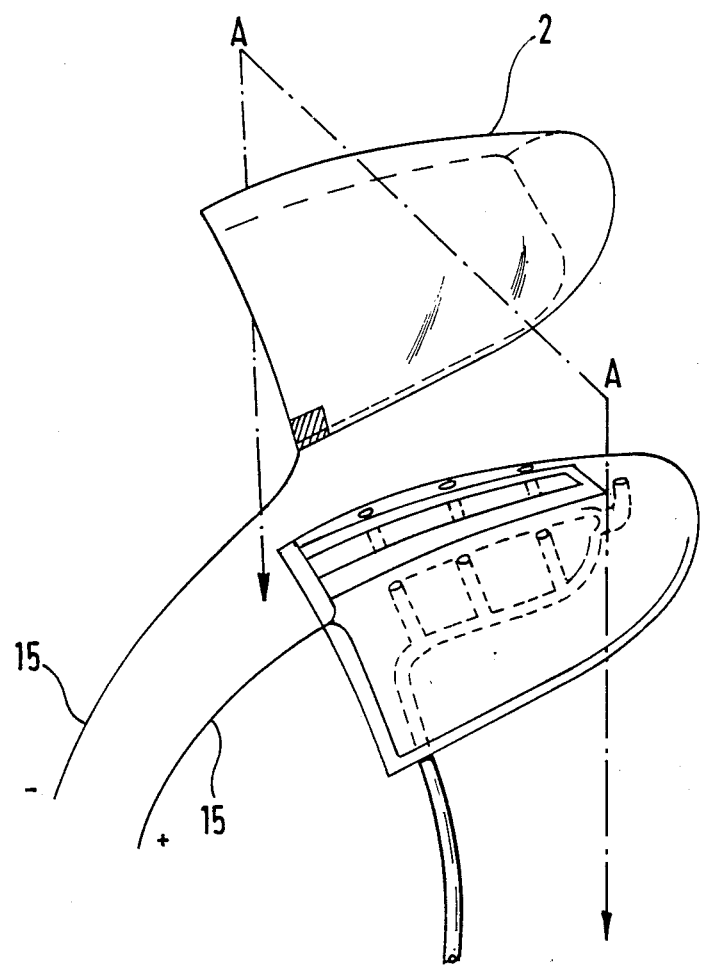

FIG. 4 shows an alternative embodiment in which the electrode 12 are not shaped to correspond with the MDC cord 7 but are instead formed as two broad strips.

FIG. 5 is a cross-sectional view of FIG. 3 through a plane A—A. This same view also corresponds closely with the view which would be seen in a plane A—A through the alternative embodiment of FIG. 4 except that the two uppermost electrodes will be broader than those shown in FIG. 5. Although each electrode is shown as being fixed inside a rebate directly to the surface of the jig, it may actually be attached to a thin layer of a sponge-like material which is interposed between the electrode and the surface of the jig to provide a constant gap and thus to ensure that a consistent corona discharge is maintained between each electrode and the canopy.

In operation, a transparent canopy 2 is placed on top of the jig 10 so that the outer surface of the jig 10 makes uniform contact with the canopy 2 so as in effect to form a mask for the canopy except at the locations of the rebates 11 containing the electrodes 12. The high voltage leads 15 and pipes 17 are connected to electrodes 12 and bores 13, respectively. The high voltage generator 14 is switched on and the potential difference between the electrodes 12 and the canopy 2 causes a corona discharge therebetween. The voltage generator 14 may be of the type manufactured by Sherman Generators which typically operate at voltages between 7 to 28 kV and at a frequency of 17 KHz.

The canopy 2 is treated by corona discharge over a localised area which corresponds to the shape of the electrodes 12 and which is consequently the same shape as the MDC 7. It will be noted that a complex shape is treated by corona discharge in this way; and moreover that there are no moving parts; nor is an enclosure required as the treatment may take place at normal pressures and in a normal (ambient) atmosphere.

The extraction pump 16 is switched on and pumps highly ionised ozone gas away from the region of canopy 2 through the bores 13. Ozone gas is a by-product of corona discharge and will damage the surface of the canopy if allowed to accumulate in sufficient concentrations. When the canopy 2 has been treated, it is removed from the jig 10 and a MDC 7 is bonded in place on the treated part of the canopy, using an appropriate adhesive such as Raychem S100S. The MDC 7 and the adhesive have to be accurately positioned on the treated area of the canopy, otherwise its bonding will be less effective. However, when the canopy is removed from the jig after corona discharge pre-treatment, the treated areas are not visibly different from the untreated area so that it will not be readily apparent as to where the adhesive and the MDC are to be applied. This difficulty may be overcome by placing the MDC, adhesive side up, into the rebates 11 of the jig 10 after pretreatment of the canopy 2 and then replacing the canopy on the jig using reference marks on the canopy and jig for accurate alignment. The MDC 7 is then bonded accurately onto the pre-treated surface of the canopy 2.

Alternatively, the embodiment of FIG. 4 may be used to treat the canopy in which case the accuracy with which the MDC is positioned on the canopy is not as critical as in the embodiment of FIG. 3. In the FIG. 4 embodiment the canopy is treated in two large strips which are each broad enough to allow for minor deviations in the position of the MDC.

Without departing from the scope of this invention further improvements in maintaining adhesive integrity of the installed cord may be achieved by subjecting the cord arrangement itself to a similar corona discharge process. For example, where the cord is contained within a polyolefin sleeve, that sleeve may be suitably treated although, since this shrink sleeving may already be in position about the explosive cord, the treatment must be such that it will neither degrade the explosive nor cause premature detonation. Beneficially, however, the above-mentioned alternative polymer extruded sleeving used to contain a circular-section cord may be similarly treated on its adhesion surface and in this arrangement it would be possible to treat the polymer extrusion prior to insertion of the detonating cord.

I claim:

1. Apparatus for electrically pre-treating selected areas of a shaped article by corona discharge, comprising an electrically nonconductive jig shaped to conform with the internal shape of, and to mount, the article, electrode means mounted on said jig and connectable to a source of high voltage, the improvement consisting in that at least one rebate is formed in an external surface of said jig of a shape, size and position corresponding to said selected areas said electrode means being located in said at least one rebate at a predetermined depth and in that said electrode means and said article are in use connected to terminals of opposite polarity of said source whereby on application of a potential difference between the article and the electrode means a corona discharge occurs at said selected areas only.

2. Apparatus according to claim 1, in which said jig includes bores therethrough for connection to a pump for removing the gaseous ionisation products of the corona discharge trapped between the jig and the article.

3. Apparatus according to claim 1, wherein said article is an aircraft cockpit canopy having an internal surface and a miniature detonating cord attached after the corona discharge treatment in a predetermined configuration to said internal surface.

4. Apparatus according to claim 3, characterised in that the electrode means are shaped as an elongated band with straight sides encompassing the largest transverse width of said cord.

5. Apparatus according to claim 3, characterised in that the electrode means are shaped as a band with a contour generally following and encompassing the contour of said cord.

6. An aircraft cockpit canopy with a detonating cord to facilitate fracture and break-up of the canopy transparency for aircrew emergency ejection purposes, the detonating cord being located around the periphery of the transparency and extending in a predetermined looped configuration across the surface of the transparency away from the periphery, at least a portion of the detonating cord being adhesively attached to said transparency, said transparency having an abrasion-free, optically clear adhesive-receptive surface provided by means of a corona discharge process.

7. A method of applying an adhesively attachable detonating cord arrangement to an aircraft canopy transparency, including modifying at least a portion of the canopy transparency to given an adhesive-receptive surface, forming the detonating cord arrangement into the required configuration on a template, applying a curable adhesive to the adhesion face of the detonating cord arrangement, offering up said cord arrangement to the transparency surface and affixing the cord, still in the desired configuration, to the said adhesive receptive surface, removing the template and curing the adhesive, the improvement residing in that the adhesive-receptive surface is obtained by subjecting at least that portion of the said surface to which the detonating cord is attached to a corona discharge process, wherein:

(a) said transparency is mounted in an electrically nonconductive jig, shaped to receive said transparency in a conforming relationship, with at least one rebate formed on the external surface of said jig of a shape, size and position corresponding to said adhesive-receptive surface portion;

(b) electrode means are mounted in said at least one rebate at a predetermined depth;

(c) said article and said electrode means are connected to terminals of opposite polarity of an electrical high voltage source;

and wherein (d) said source is energised to apply a potential difference between said article and said electrode means such as to cause a corona discharge to occur at said portion.

* * * * *